(12) United States Patent
Rakshit et al.

(10) Patent No.: US 11,618,564 B2
(45) Date of Patent: Apr. 4, 2023

(54) UNMANNED VEHICLE MAINTENANCE (71) Applicant: International Business Machines Corporation, Armonk, NY (US)

(72) Inventors: Sarbajit K Rakshit, Kolkata (IN); Charbak Roy, Kolkata (IN); Ujjal Nandi, Kolkata (IN); Mahashweta Roy, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 17/084,679

(22) Filed: Oct. 30, 2020

(65) Prior Publication Data
US 2022/0135218 A1    May 5, 2022

(51) Int. Cl.
| | |
|---|---|
| B64C 39/02 | (2023.01) |
| B64C 27/473 | (2006.01) |
| B64D 47/08 | (2006.01) |
| B64D 45/00 | (2006.01) |
| B64C 27/20 | (2023.01) |
| B64U 10/13 | (2023.01) |
| B64U 30/20 | (2023.01) |

(52) U.S. Cl.
CPC ............ B64C 39/024 (2013.01); B64C 27/20 (2013.01); B64C 27/473 (2013.01); B64D 45/00 (2013.01); B64D 47/08 (2013.01); *B64D 2045/0085* (2013.01); *B64U 10/13* (2023.01); *B64U 30/20* (2023.01); *B64U 2201/104* (2023.01)

(58) Field of Classification Search
CPC . B64C 27/20; B64C 2201/108; B64C 27/473; B64C 27/16
See application file for complete search history.

(56) References Cited

U.S. PATENT DOCUMENTS

| | | | |
|---|---|---|---|
| 2016/0339789 A1 | 11/2016 | Wang | |
| 2018/0118336 A1* | 5/2018 | Drennan | ................ B64D 39/00 |
| 2019/0210720 A1* | 7/2019 | Beckman | ................ B64C 23/06 |

FOREIGN PATENT DOCUMENTS

| | | | | |
|---|---|---|---|---|
| CN | 105069507 B | | 1/2019 | |
| EP | 2774843 B1 | * | 4/2016 | ............. B64C 23/06 |

OTHER PUBLICATIONS

"Holy Stone HS110W,HS200W RC Drone Quadcopter Spare Parts Crash Pack (2 Spare Blades Sets+ 4 Propeller Guards+ 2 Landing Gears + 2 Replacement Motors)" Amazon.com, accessed Jan. 17, 2020, 7 pages. <https://www.amazon.com/Holy-Stone-Quadcopter-Propeller-Replacement/dp/B01G80TQ0K?ref_=fsclp_pl_dp_1>.

(Continued)

*Primary Examiner* — Jelani A Smith
*Assistant Examiner* — Davin Seol
(74) *Attorney, Agent, or Firm* — Brian D. Welle (57) ABSTRACT

An unmanned aerial vehicle includes a blade that is configured to rotate relative to a body of the unmanned aerial vehicle to enable the unmanned aerial vehicle to fly. The blade defines at least one cavity. The blade includes a power source and an auxiliary rotor configured to use the power source to rotate relative to the blade to cause the blade to fly. The auxiliary rotor is configured to withdraw into the at least one cavity. The blade is configured to decouple from the unmanned aerial vehicle. The auxiliary rotor is configured to extend from the at least one cavity and cause the blade to fly such that the blade navigates away from the unmanned aerial vehicle using the auxiliary rotor.

20 Claims, 4 Drawing Sheets

(56) References Cited

OTHER PUBLICATIONS

"Spare Drone Blades," CheapDrone.co.uk, accessed Jan. 17, 2020, 2 pages. <https://cheapdrone.co.uk/drone-parts/spare-drone-blades>.

Cantieri et al., "Fixing satellites in space," Astronomy.com, Dec. 14, 2017, 8 pages. <http://www.astronomy.com/news/2017/12/fixing-satellites-in-space>.

Fujii et al., "Endless Flyer: A Continuous Flying Drone with Automatic Battery Replacement," 2013 IEEE 10th International Conference on Ubiquitous Intelligence & Computing and 2013 IEEE 10th International Conference on Autonomic & Trusted Computing, Dec. 18-21, 2013, pp. 216-233. <https://www.researchgate.net/publication/262296753_Endless_Flyer_A_Continuous_Flying_Drone_with_Automatic_Battery_Replacement>.

Grush, "Fixing broken satellites in space could save companies big money," The Verge, Jan. 10, 2019, 6 pages. <https://www.theverge.com/2019/1/10/18173600/worldview-4-satellite-servicing-repair-gyroscope-space>.

Hall, "How Often Should You Change Your Drone's Propellors?" Let Us Drone, Jan. 17, 2019, 6 pages. <https://www.letusdrone.com/how-often-should-you-change-your-drones-propellors/>.

Lynskey et al., "Facility Location Problem Approach for Distributed Drones," Symmetry, vol. 11, Issue 118, Jan. 20, 2019, 11 pages, <https://www.mdpi.com/2073-8994/11/1/118/pdf>.

Oyen, "IBM Patents Drone Invention for in Air Cargo Transfer," Drone Community, May 1, 2017, 6 pages. <https://www.dronecommunity.biz/drone-invention-in-air-cargo-transfer/>.

\* cited by examiner

UNMANNED VEHICLE MAINTENANCE

BACKGROUND

Unmanned aerial vehicles are robotic devices that are capable of flight. These unmanned aerial vehicles are used for a plurality of private and commercial purposes. For examples, unmanned aerial vehicles may be used to take a picture of a house to take that house to market, to apply agricultural materials (e.g., fertilizer, pesticide) to crops, to deliver packages, to race other unmanned aerial vehicles, or the like. As unmanned aerial vehicles become more robust, they are regularly sent further and further away from a central base to accomplish various tasks.

SUMMARY

Aspects of the present disclosure relate to a method, system, and computer program product relating to maintenance of an unmanned aerial vehicle. For example, the method includes decoupling a blade of an unmanned aerial vehicle from a body of the unmanned aerial vehicle. The blade is configured to rotate relative to a body of the unmanned aerial vehicle to enable the unmanned aerial vehicle to fly. The blade defines at least one cavity. The method further includes extending at least one auxiliary rotor from the at least one cavity. The at least one auxiliary rotor is configured to use a power source of the blade to rotate relative to the blade to cause the blade to fly. The method further includes navigating the blade away from the unmanned aerial vehicle using the at least one auxiliary rotor. A system and computer product configured to perform the above method are also disclosed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to managing maintenance of an unmanned aerial vehicle (UAV), while more particular aspects of the present disclosure relate to blades of a UAV that are configured to decouple from the UAV and navigate relative to the UAV via auxiliary rotors of the blades. While the present disclosure is not necessarily limited to such applications, various aspects of the disclosure may be appreciated through a discussion of various examples using this context.

UAVs are used for a plurality of personal and commercial purposes. For example, UAVs may be used for recreation, to deliver packages, to meet/complete/satisfy agricultural purposes, or the like. Some UAVs may be sent to locations that are relatively difficult for their human operators to reach. For example, a UAV sent to deliver pesticides to crops may be a few hundred yards away from the nearest human operator, separated by acres of crops or natural features such as rivers or trees. Similarly, a UAV sent to deliver a package from a delivery center may be sent across town, such that many buildings, bridges, vehicles, or the like may be between the nearest human operator and the UAV in transit.

In some examples, UAVs may be damaged during operation. One type of damage that may occur includes damage to a "blade" of the UAV, which is a component that is configured to spin relative to a body of the UAV to cause the UAV to fly and navigate. In some examples, this damage may be substantial enough that the abilities of the UAV to operate may be reduced or eliminated. Put differently, one or more blades of the UAV may be damaged such that the UAV is no longer capable of flight (or at least no longer capable of completing a task within a threshold duration or the like). In such examples, a conventional UAV may be configured to land and/or send out a distress signal to an operator. The operator then has to locate the UAV and replace the blade. However, given that, as discussed above, conventional UAVs are able to travel relatively far away from an operator, it may be extremely difficult for the operator to locate the UAV. Further, even if an operator is able to locate the UAV, it may take a substantial amount of time and/or effort to do so, at which point it may be difficult and/or impossible for the UAV to execute the task for which the UAV was initially sent out to do. For example, if a UAV is scheduled to deliver pesticides to 100 acres of crops as identified by a camera of the UAV, and a damaged blade causes the UAV to be unoperational until a human operator has time to navigate a mile into the acreage to locate and fix the blade 5 hours later, there may be insufficient daylight to continue applying the pesticides that day.

Aspects of this disclosure are related to configuring blades of a UAV such that the blades may be independently navigable relative to the UAV. Put differently, each blade of a UAV may be configured to fly independently (e.g., fly away from the UAV without any other component of the UAV) even after being damaged such that the UAV is no longer able to fly at all, and/or is no longer able to fly with at least a threshold amount of efficiency (e.g., a ratio of power consumed to distance traveled). These blades may be configured to fly as a result of one or more auxiliary rotors of the blades. These auxiliary blades may be configured to extend from a stowed state (e.g., a position within a cavity or recess defined by the blade) to a deployed state.

The blades may be configured to deploy these auxiliary rotors in response to identifying that the blade is damaged. This damage may be identified by computing components such as a processing unit executing instructions stored on memory, these computing components referred to as a controller herein. The controller may be stored on the blade and may be configured to identify that the blade is damaged. Additionally, or alternatively, a controller on the UAV may identify that the blade is damaged, or a remote controller on a remote server or computing device that monitors the UAV may identify that the blade is damaged, in response to which one of these controllers may inform a blade controller to navigate away from the UAV. Either way, a controller may identify that the blade is damaged via one or more diagnostic data from one or more sensors that detect damage on the blade, or the controller may identify that the blade is damaged because a flight pattern of the UAV exhibits an impaired characteristic (e.g., the UAV is flying off kilter relative to an instructed flight pattern, or the UAV is slow to pitch, yaw, or roll in a certain direction).

Once a controller of the blade identifies that the blade is damaged, the controller may cause the auxiliary rotors to extend from the blade. Once extended, the controller may utilize these auxiliary rotors to navigate the blade to a determined location for maintenance. The controller may use a power source within the blade to power the auxiliary rotors (and/or itself). Further, the controller may use other components, such as a global positioning system (GPS) device, a camera, or the like to enable the controller to navigate the blade toward an intended location independent of the UAV.

The controller of the blade may be configured to decouple the blade from the UAV so that the blade may navigate back for maintenance. Similarly, the controller may be configured to couple the blade to the UAV when the blade is operable (e.g., after repair) to bring the UAV back to full operation. In this way, aspects of this disclosure may be configured to enable blades of a UAV to fly independently of their UAV such that a UAV system is configured to provide maintenance related to a damaged blade without on-site assistance from a human operator.

Figure 1A:
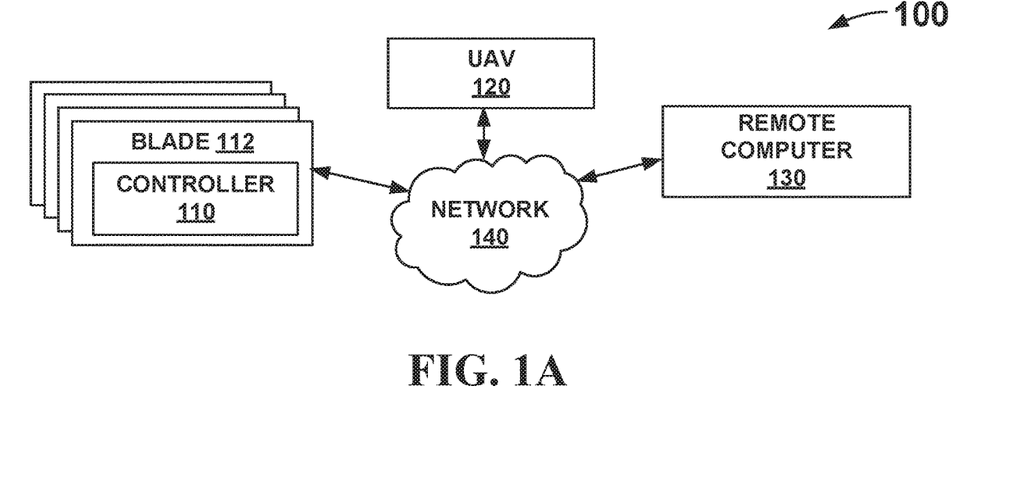
FIG. 1A depicts a conceptual diagram of an example system in which a controller may manage maintenance of an unmanned aerial vehicle (UAV) consistent with embodiments of this disclosure.
Figure 3:
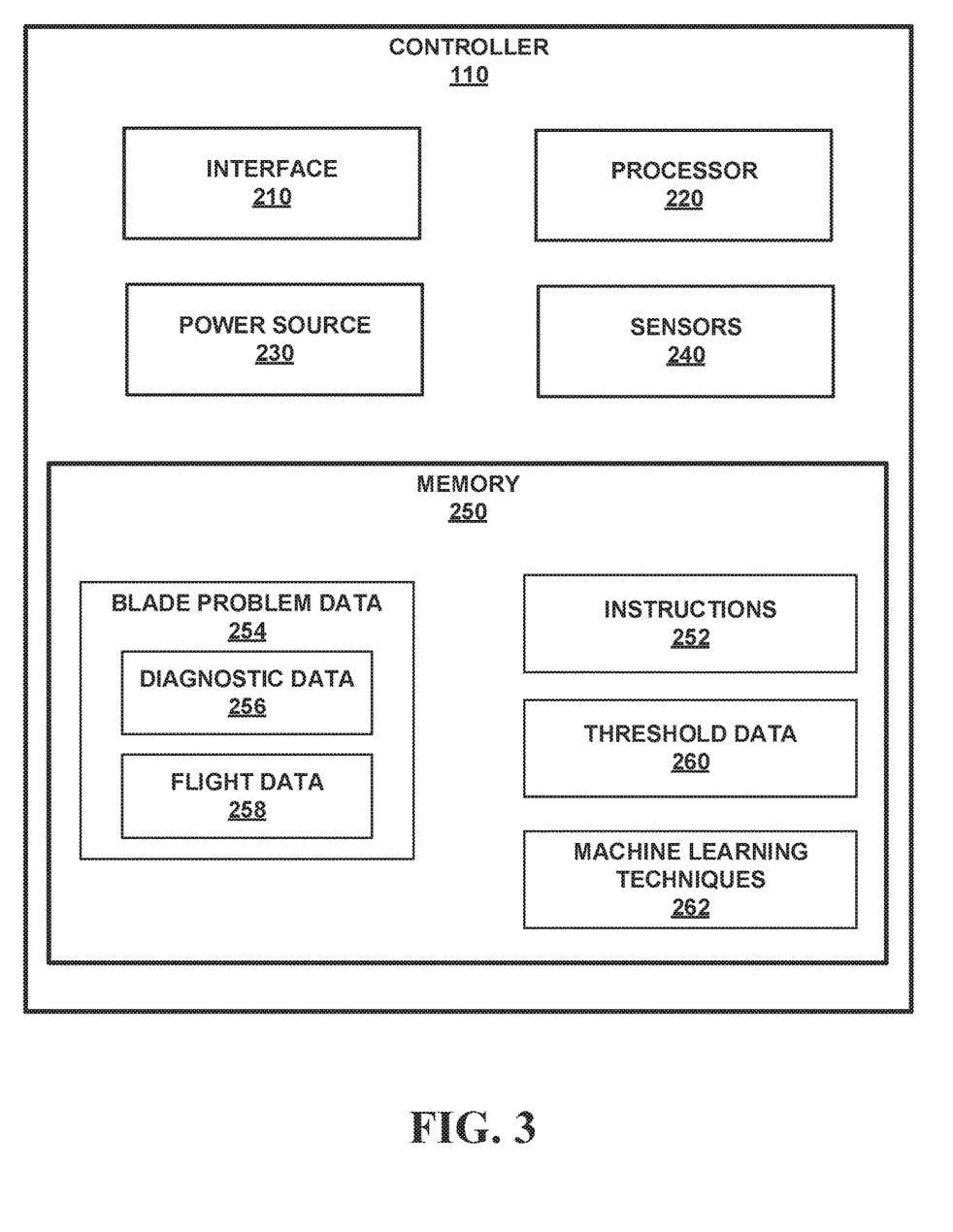
FIG. 3 depicts a conceptual box diagram of example components of the controller of FIG. 1A.

For example, FIG. 1A depicts system 100 that includes controller 110 of blade 112 that is configured to navigate independently of UAV 120 as discussed herein. As described above, controller 110 may comprise one or more computing elements, such as one or more processing units, interfaces, memories, sensors, and/or power sources, similar to what is depicted in FIG. 3. Though controller 110 is discussed and depicted predominantly as within a single housing in blade 112, in other examples the functionality of controller 110 may be provided by a plurality of discrete objects housed within different portions of blade 112 (e.g., a power source that is coupled to one or more discrete processing circuits, all of which are independently secured within a central hub of blade 112). As depicted, there may be numerous blades 112 on one UAV 120. For example, there may be two, three, four, or more blades 112 on UAV 120.

As discussed herein, UAV 120 may be a robotic device that is configured to fly without a human aboard. UAV 120 may be configured to fly along a predetermined route, and/or UAV 120 may be configured to autonomously determine a route in operation to execute a predetermined task. For example, UAV 120 may be configured for agricultural use, such that UAV 120 is instructed to apply pesticides to a plurality of crops at a plurality of locations, after which UAV 120 flies to and "treats" (e.g., apply water, pesticide, fertilizer, or the like) these crops according to the instructions without human supervision during operation. For another example, UAV 120 may be loaded up with one or more packages and provided instructions that detail one or more relevant delivery addresses, and UAV 120 may fly to these respective addresses to deliver the respective packages without human supervision during this delivery.

In other examples, UAV 120 may be at all times controlled and/or monitored by a human operator that is operating UAV 120 via remote computer 130, which may be a computing device such as a laptop, desktop, remote control, cell phone, server, or the like. For example, an operator may control a racing UAV 120 through an obstacle course via remote control of remote computer 130 to complete the obstacle course as quickly as possible. Alternatively, this same operator may control this same racing UAV 120 through this obstacle course via a relatively large remote computer 130 setup that includes a live feed being provided to the operator on a display of the remote computer 130. Further, the human operator may operate UAV 120 via one or more joysticks or steering wheels or the like. In such a way, an operator may use remote computer 130 to operate UAV 120 by communicating with UAV 120 via a live feed over network 140.

Network 140 may include a computing network over which computing messages may be sent and/or received. For example, network 140 may include the Internet, a local area network (LAN), a wide area network (WAN), a wireless network such as a wireless LAN (WLAN), or the like. Network 140 may comprise copper transmission cables, optical transmission fibers, wireless transmission, routers, firewalls, switches, gateway computers and/or edge servers. A network adapter card or network interface in each computing/processing device (e.g., controller 110, UAV 120, and remote computer 130) may receive messages and/or instructions from and/or through network 140 and forward the messages and/or instructions for storage or execution or the like to a respective memory or processor of the respective computing/processing device.

Though network 140 is depicted as a single entity in FIG. 1A for purposes of illustration, in other examples network 140 may include a plurality of private and/or public networks. For example, controller 110 and UAV 120 may communicate over network 140 initially via a directly wired physical connection when blade 112 is coupled to UAV 120, and/or controller 110 and UAV 120 may communicate over network 140 via Bluetooth or radio-frequency identification (RFID) or the like when blade 112 is not coupled to UAV 120. For another example, an operator using remote computer 130 may operate UAV 120 over a private WLAN of network 140 to which remote computer 130 is connected via the Internet.

A component of system 100 may identify that blade 112 is damaged. For example, controller 110 may identify that blade 112 is damaged, UAV 120 may identify that blade 112 is damaged, and/or remote computer 130 may identify that blade 112 is damaged after data is sent to remote computer 130 over network 140. In response to this determination, controller 110 may extend one or more auxiliary rotors from blade 112. For example, FIG. 1B depicts a top-down depiction of UAV 120 with four blades 112A-112D (each of which may be similar to blade 112 described above) coupled to body 150 of UAV 120, with auxiliary rotors 160A, 160B

(collectively, "auxiliary rotors 160") extending from blade 112A. The depicted relative shapes and sizes of components of FIG. 1B are depicted for purposes of clarity only to enable relevant components to be seen. Controller 110 may utilize auxiliary rotors 160 to navigate blade 112A away from UAV 120 and towards a location at which blade 112A may receive maintenance. Controller 110 may cause auxiliary rotors 160 to work together to provide the lift and control to navigate blade 112A, as would be understood by one of ordinary skill in the art. Controller 110 may communicate with remote computer 130 to identify a nearest maintenance location. Similarly, controller 110 may communicate with remote computer 130 to cause a replacement blade 112 to be sent to a location of UAV 120 to replace blade 112A if UAV 120 has a time-sensitive task (e.g., such as delivering a package for a delivery service by a predetermined date and time). An incoming replacement blade 112 and an associated controller 110 of this replacement blade 112 may communicate with UAV 120 when replacement blade 112 is incoming to identify an exact location and joint at which replacement blade 112 is to be coupled as described herein.

Figure 1B:
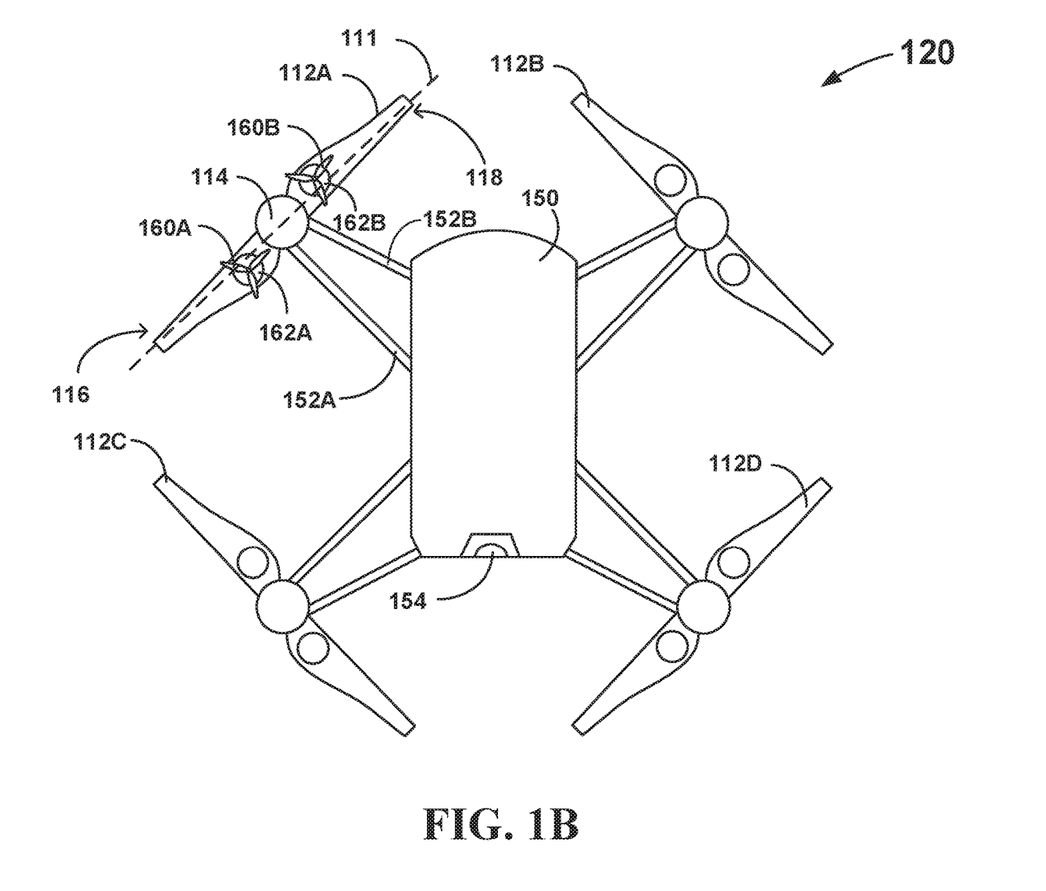
FIG. 1B depicts a top-down view of an example UAV with detachable blades, each of which includes respective auxiliary rotors.

The specific shape and configuration of UAV 120 depicted in FIG. 1B is provided for purposes of illustration only, and it is to be understood that UAV 120 may define other shapes with, e.g., different numbers of blades 112 attached to UAV 120 in different ways that are consistent with this disclosure. In some examples, a number of blades 112 of UAV 120 may impact a lift force of the UAV 120 (e.g., where additional blades 112 increases a lift force of UAV 120).

Auxiliary rotors 160 may be placed on respective blades 112 such that auxiliary rotors 160 are configured to provide sufficient lift and control for blades 112 to navigate independently of UAV 120. For example, auxiliary rotors 160 may be mirrored across hub 114 of blade 112, such that a center of mass of blade 112 is between auxiliary rotors 160. For example, one auxiliary rotor 160A may be relatively near one longitudinal end 116 of blade 112 (e.g., ⅕ the way down blade 112 along a longitudinal axis of blade 112, or ¼ the way down blade 112, or the like), and another auxiliary rotor 160B may be relatively near an opposing longitudinal end 118 of blade 112 that is on a different side of hub 114.

Auxiliary rotors 160 may be configured to extend out from respective cavities 162A, 162B defined by respective blades 112. Controller 110 may be configured to cause each auxiliary rotor 160 to achieve a stowed state where these auxiliary rotors 160 are fully within respective cavities 162, such that a profile of blades 112 is smooth and does not reflect auxiliary rotors 160. By configuring blades 112 such that respective auxiliary rotors 160 may retract within respective cavities 162 to define a stowed state in which auxiliary rotors 160 are inside a cavity (and therein do not alter a profile of blades 112), blades 112 may maintain an ability to provide lift and navigability for UAV 120 while being independently navigable from UAV 120 while auxiliary rotors 160 are in stowed state. In other examples (not depicted), auxiliary rotors 160 may define a stowed state by coming to rest within channels defined by blade 112 such that an outer surface of auxiliary rotors 160 is flush with an adjacent outer surface of blade 112 to not modify a profile of blade 112 (e.g., such that an outer surface of blade 112 does not define a substantial ridge or depression at or near this channel when this channel receives a respective auxiliary rotor 160).

In some examples, hub 114 may include controller 110. For example, one or more power supply, processing circuit, sensor, memory, and interface of controller 110 may all be within hub 114. In other examples, hub 114 may include fewer or no components of controller 110.

Hub 114 may be configured to couple to a joint at which legs 152A, 152B (collectively, "legs 152") of UAV 120 intersect. As depicted, legs 152 may extend away from body 150 of UAV 120 such that, as coupled to a joint of legs 152, blades 112 may rotate without contacting body 150 and/or each other.

Body 150 of UAV 120 may house a plurality of computing components to enable UAV 120 to fly. For example, body 150 may include processing circuitry that is configured to enable UAV 120 to fly, a power supply to power blades 112, memory, sensors, or the like. As described herein, in some examples some functionality attributed to controller 110 may be executed by processing circuitry stored within body 150 of UAV 120. Further, body 150 may include camera 154 that is configured to capture a live feed of scenery around UAV 120. UAV 120 may analyze images from camera 154 to cause blades 112 to rotate in a certain fashion to cause UAV 120 to fly in a certain way relative to detected objects around UAV 120. Additionally, or alternatively, UAV 120 may send live feed from camera 154 to a display of remote computer 130. With this live feed, a human operator may use an interface of remote computer 130 to send flight instructions to UAV 120 which processing circuitry of UAV 120 will execute using blades 112.

Blades 112 of UAV 120 may become damaged. Blades 112 of UAV 120 may be damaged in such a way that UAV 120 no longer has sufficient power to execute tasks, as blade 112 is no longer able to rotate as designed, provide a lift force as designed, or the like. For example, the blades 112 of UAV 120 may be struck by a physical object (e.g., a bird or a branch), a bearing of hub 114 that enables a respective blade 112 to rotate relative to legs 152 may become out of alignment such that blade 112 is not able to rotate as freely as intended, or the like. This damage may be detected. Controller 110 may detect this damage, and/or a processing unit within body 150 may detect this damage. For purposes of clarity throughout this disclosure controller 110 of the damaged blade 112 is predominantly discussed as detecting this damage, though in other examples some or all of this detection may additionally or alternatively be executed by a processing circuit within another portion of UAV 120 and/or by remote computer 130 that is sent flight and/or diagnostic data of blade 112.

Controller 110 may analyze diagnostic data of blade 112 to identify that blade 112 is damaged. This diagnostic data may reveal that, as a result of this damage to blade 112, UAV 120 is no longer able to balance as designed, no longer has a designed amount of lift force, or the like. For example, controller 110 may analyze data from one of more sensors (e.g., a centrifugal sensor or a position sensor or the like) to detect that a motion of blade 112 fails a tolerance. For example, controller 110 may identify that blade 112 has been instructed to execute 300 rotations per minute (RPMs), but is instead executing 275 RPMs, which is outside of a 95% tolerance threshold (e.g., where blade 112 could execute 285 RPMs and be within tolerance). For another example, controller 110 may use one or more laser scanners or a position scanner or the like to identify a new physical imperfection of blade 112 such as a new divot in a surface of blade or an undesired bend in a profile of blade 112 (e.g., such that an end of blade 112 has been bent back toward hub 114 of blade 112).

For another example, controller 110 may analyze flight data to identify that UAV 120 is not flying as instructed. For example, controller 110 may compare a flight plan that UAV 120 was instructed to take (e.g., instructed by a human operator using remote computer 130, or instructed by a central processing circuit of UAV 120) against a detected flight path that UAV 120 actually executed in attempting to follow the flight plan. In comparing the instructed flight plan to the executed flight path, controller 110 may identify a deviation between the two, and may identify that this deviation indicates damage to one or more blades 112. For example, if controller 110 indicates that an instructed flight plan (e.g., instructions on how to rotate blades 112 as sent by UAV 120) has a straight path while an executed flight path of UAV 120 includes a slight roll in one direction, controller 110 may identify that this indicates that one of blades 112 is not rotating as directed. Controller 110 may determine whether a deviation between an instructed flight plan and an executed flight path is constant, regardless of what direction UAV 120 is heading in, and is more than a threshold deviation, to exclude winds or the like that may cause temporary deviations.

Figure 2A:
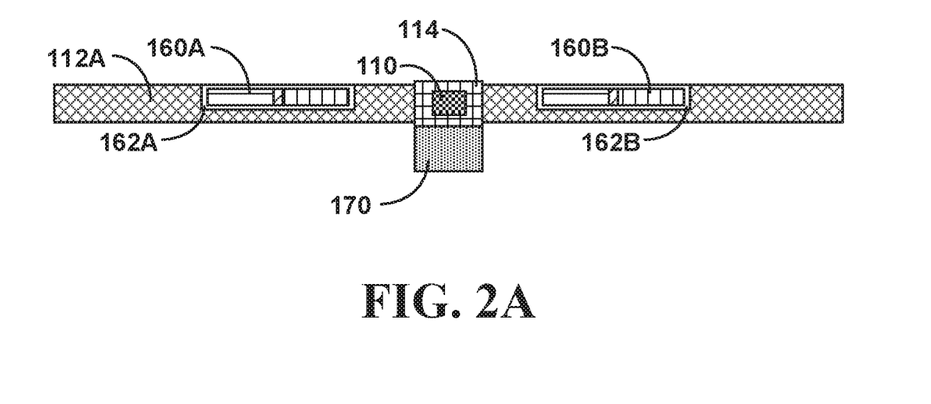
FIG. 2A depicts a conceptual cross-sectional view of a detachable blade of the UAV of FIG. 1B as coupled to a joint of the UAV with auxiliary rotors in a stowed state within a cavity of the detachable blade.
Figure 2B:
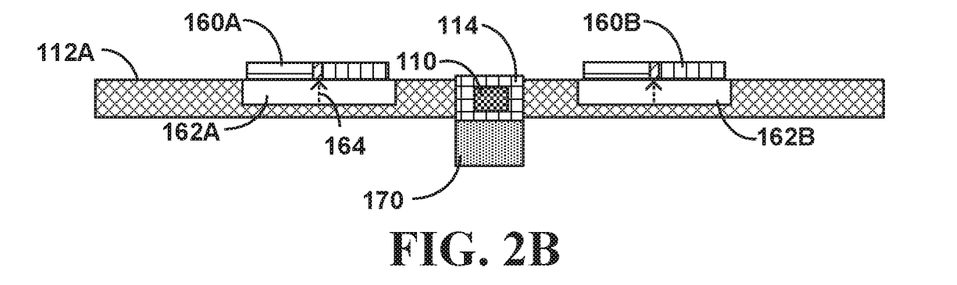
FIG. 2B depicts a conceptual cross-sectional view of a detachable blade of the UAV of FIG. 1B as coupled to a joint of the UAV with auxiliary rotors in a deployed state.
Figure 2C:
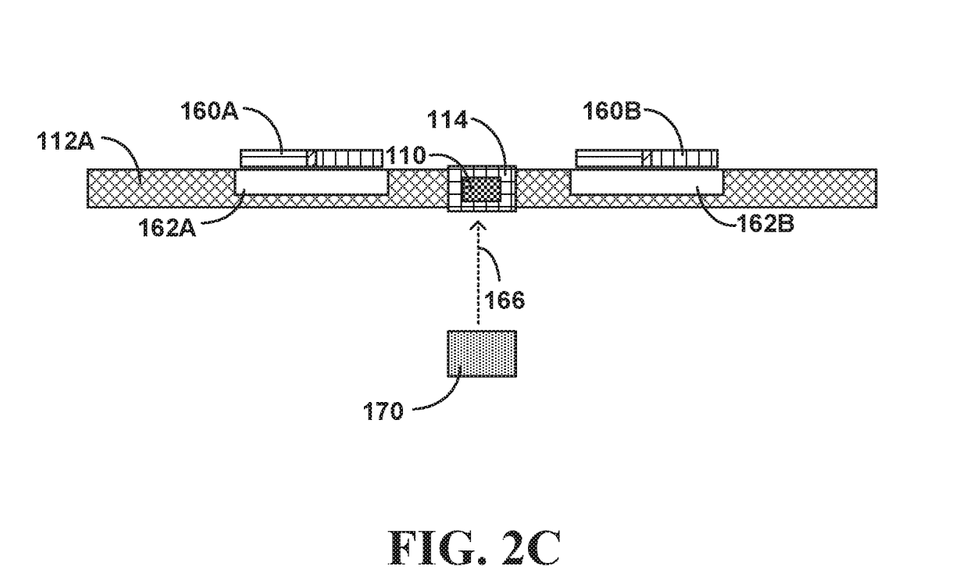
FIG. 2C depicts a conceptual cross-sectional view of a detachable blade of the UAV of FIG. 1B as decoupled to a joint of the UAV with auxiliary rotors deployed

In response to detecting damage to one or more blades 112 in this way, controller 110 may be configured to decouple damaged blades 112 and cause these damaged blades 112 to navigate away from body 150 of UAV 120 to provide maintenance to UAV 120. For example, FIGS. 2A-2C depict cross-sectional box diagrams of blade 112A along cut plane 111 of FIG. 1B. The depicted relative shapes and sizes of components of FIGS. 2A-2C is depicted for purposes of clarity only to enable relevant components to be seen. For example, as understood by one of ordinary skill in the art, blade 112A may define a thinner profile as blade 112A extends longitudinally away from hub 114, and/or blade 112A may define a curve to better provide lift when rotated.

FIGS. 2A-2C depict joint 170 where legs 152 of UAV 120 meet. Joint 170 and/or hub 114 define a mechanism to couple joint 170 to hub 114. Joint 170 and/or hub 114 may define a mechanism that is strong enough such that the mechanism is unlikely to fail (e.g., decouple) during operation of UAV 120. Further, joint 170 and/or hub 114 may define a mechanism that is configured to repeatedly couple and uncouple as commanded by controller 110 and/or UAV 120.

For example, joint 170 and/or hub 114 may define a mechanical attachment, such as a component of hub 114 that is configured to mate with a component of joint 170 as commanded by controller 110. For another example, joint 170 and/or hub 114 may be magnetically coupled, such that a magnet of, e.g., hub 114 may be deactivated to decouple hub 114 from joint 170.

As described above, controller 110 may detect damage to blade 112A. Prior to detecting this damage, controller 110 may have caused auxiliary rotors 160 to stay within respective cavities 162 defined by blade 112A to define the stowed state of FIG. 2A. As depicted within FIG. 2A, blade 112A may include a cover or shutter or the like for each cavity 162 that extends over the respective cavity 162 when auxiliary rotors 160 are in this stowed state. In other examples, rather than providing a cover or shutter, auxiliary rotors 160 may rest flush within cavity 162 to define a substantially flat external surface of blade 112A (e.g., rather than defining substantial recesses or bumps in a profile of blade 112A when auxiliary rotors 160 are in the stowed state).

In response to the detected damage, controller 110 may cause auxiliary rotors 160 to extend in direction 164 away from cavity 162 to define the deployed state as depicted in FIG. 2B. Controller 110 may cause an actuating component to push auxiliary rotors 160 away from respective cavities 162 to such a degree that auxiliary rotors 160 may rotate without contacting blade 112A. Once auxiliary rotors 160 are in the deployed state, controller 110 may cause auxiliary rotors 160 to start rotating. In some examples, auxiliary rotors 160 may start rotating while blade 112A is still coupled to UAV 120 via joint 170, such that UAV 120 can be stabilized (and/or landed as applicable) utilizing the lift power of auxiliary rotors 160 in addition to the undamaged blades 112B-112D of UAV 120.

Controller 110 may uncouple joint 170 from hub 114 as described herein, and then navigate blade 112A in direction 166 away from joint 170 of UAV 120 (and therein away from body 150 of UAV 120). Once detached, controller 110 may navigate blade 112A to a location at which blade 112A may be repaired. Controller 110 may include one or more sensors to navigate blade 112A, such as a GPS sensor, an altitude sensor, a camera, or the like. After blade 112A has been repaired, in some examples controller 110 may navigate blade 112A back to UAV 120 and then couple hub 114 of blade 112A to joint 170 to return UAV 120 to full functionality. In other examples, controller 110 may instruct replacement blade 112 to replace damaged blade 112A immediately upon detecting damage to blade 112A, such that UAV 120 is non-operational for as little a duration as possible.

As described above, controller 110 may include a processor configured to execute instructions stored on a memory to execute the techniques described herein. For example, FIG. 3 is a conceptual box diagram of such computing device of controller 110. While controller 110 is depicted as a single entity (e.g., within a single housing) for the purposes of illustration in FIG. 3, as described above in other examples the components of controller 110 be stored within blade 112 as discrete physical elements (e.g., discrete components all uniquely secured within hub 114 and coupled together). Controller 110 may include interface 210, processor 220, power source 230, sensor 240, and memory 250. Controller 110 may include any number or amount of interface(s) 210, processor(s) 220, power sources 230, sensors 240, and/or memory(s) 250.

Controller 110 may include components that enable controller 110 to communicate with (e.g., send data to and receive and utilize data transmitted by) devices that are external to controller 110. For example, controller 110 may include interface 210 that is configured to enable controller 110 and components of controller 110 (e.g., such as processor 220) to communicate with entities external to controller 110. Specifically, interface 210 may be configured to enable components of controller 110 to communicate with UAV 120, remote computer 130, or the like. Interface 210 may include one or more network interface cards, such as Ethernet cards, and/or any other types of interface devices that can send and receive information. Any suitable number of interfaces may be used to perform the described functions according to particular needs.

As discussed herein, controller 110 may be configured to manage the maintenance and/or replacement of blade 112. Controller 110 may utilize processor 220 to detect damage to blade 112, extend auxiliary rotors 160 to stabilize UAV 120, decouple blade 112, and navigate blade 112 as discussed herein. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to manage the maintenance of blade 112 in this way, such as one processor of blade 112 and one processor of body 150 of UAV 120 that execute different operations described herein.

Controller 110 may include power source 230. Power source 230 may be configured to provide power for controller 110 to execute instructions of memory 250. Additionally, or alternatively, power source 230 may be configured to provide power for sensors 240 to gather and sense data as described herein. Additionally, or alternatively, power source 230 may be configured to provide power for auxiliary rotors 160 to rotate as controlled by controller 110 to cause blade to fly. In some examples, power source 230 may include different power sources for some or each of these needs. Power source 230 may be substantially any kind of power source, such as lithium-ion batteries, nuclear cells, bio-fuel cells, or the like.

Controller 110 may further include sensors 240. Sensors 240 may be configured to gather data with which it can be identified that blade 112 is damaged. For example, sensors 240 may include a laser scanner that can gather shape information, position sensors 240 that can gather relative positions of objects (e.g. to see if a tip of blade 112 has been bent), alignment sensors 240 that can determine relative alignment, or the like. Additionally, sensors 240 may include sensors that can determine whether or not an executed flight path of UAV 120 is within a threshold amount of an instructed flight plan of UAV 120. This may include an altitude sensor, a GPS sensor, a gyroscope sensor, a velocity or acceleration sensor, or the like.

In some examples, sensors 240 are also configured to enable controller 110 to guide blade 112. For example, sensors 240 may gather information with which controller 110 can determine a relative position of blade 112 while controller 110 is causing blade 112 to fly independently of UAV 120. Examples of such sensors 240 may include a camera, an altitude sensor, or the like.

Processor 220 may manage maintenance of blade 112 by executing the operations described herein according to instructions 252 stored on memory 250 of controller 110. Memory 250 may include a computer-readable storage medium or computer-readable storage device. In some examples, memory 250 may include one or more of a short-term memory or a long-term memory. Memory 250 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may manage maintenance by identifying damage to blade 112 and causing blade 112 to fly relative to UAV 120 as described herein according to instructions 252 of one or more applications (e.g., software applications) stored in memory 250 of controller 110.

In addition to instructions 252, in some examples gathered or predetermined data or techniques or the like as used by processor 220 to manage the maintenance of blades may be stored within memory 250. For example, as depicted in FIG. 3, memory 250 may include blade problem data 254 that may be used to determine whether or not blade 112 is damaged. For example, blade problem data 254 includes diagnostic data 256 that can be used to determine if data from sensors 240 indicate that blade 112 is damaged. For example, diagnostic data 256 may include a shape of blade 112 that is within tolerance, such that if data gathered by sensors 240 returns shape data that is outside a tolerance established by diagnostic data 256 that controller 110 may determine that blade 112 is damaged. Similarly, blade problem data 254 includes flight data 258. Flight data 258 may include one or both of an instructed flight plans as instructed by UAV 120 and/or remote computer 130 and an executed flight path as gathered by sensors 240 as described herein. Controller 110 may analyze a difference between an instructed flight plan and an executed flight path to determine whether or not blade 112 is damaged.

In some examples, memory 250 may also include threshold data 260. Threshold data 260 may include one or more thresholds related to one or more operations, such as a threshold of shape data that indicates blade 112 is damaged, and/or a threshold between a flight path and a flight pattern that might indicate blade 112 is damaged. Similarly, threshold data 260 may relate to how UAV 120 reacts when damage to blade 112 is detected. For example, threshold data 260 may indicate that if an environment of UAV 120 has a threshold amount of clearance to the ground that UAV 120 is to land to enable damaged blade 112 navigating away, and conversely if the area has less than that threshold clearance stored within threshold data 260 that UAV 120 is to hover in place until an operable blade 112 returns.

Memory 250 may further include machine learning techniques 262 that controller 110 may use to improve a process of detecting damage to blade 112 and navigating blade 112 relative to body 150 of UAV 120. Machine learning techniques 262 can comprise algorithms or models that are generated by performing supervised, unsupervised, or semi-supervised training on a dataset, and subsequently applying the generated algorithm or model to detect damage to and subsequently navigate blade 112 according to threshold data 260.

Machine learning techniques 262 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning algorithms.

For example, the machine learning techniques 262 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

Figure 4:
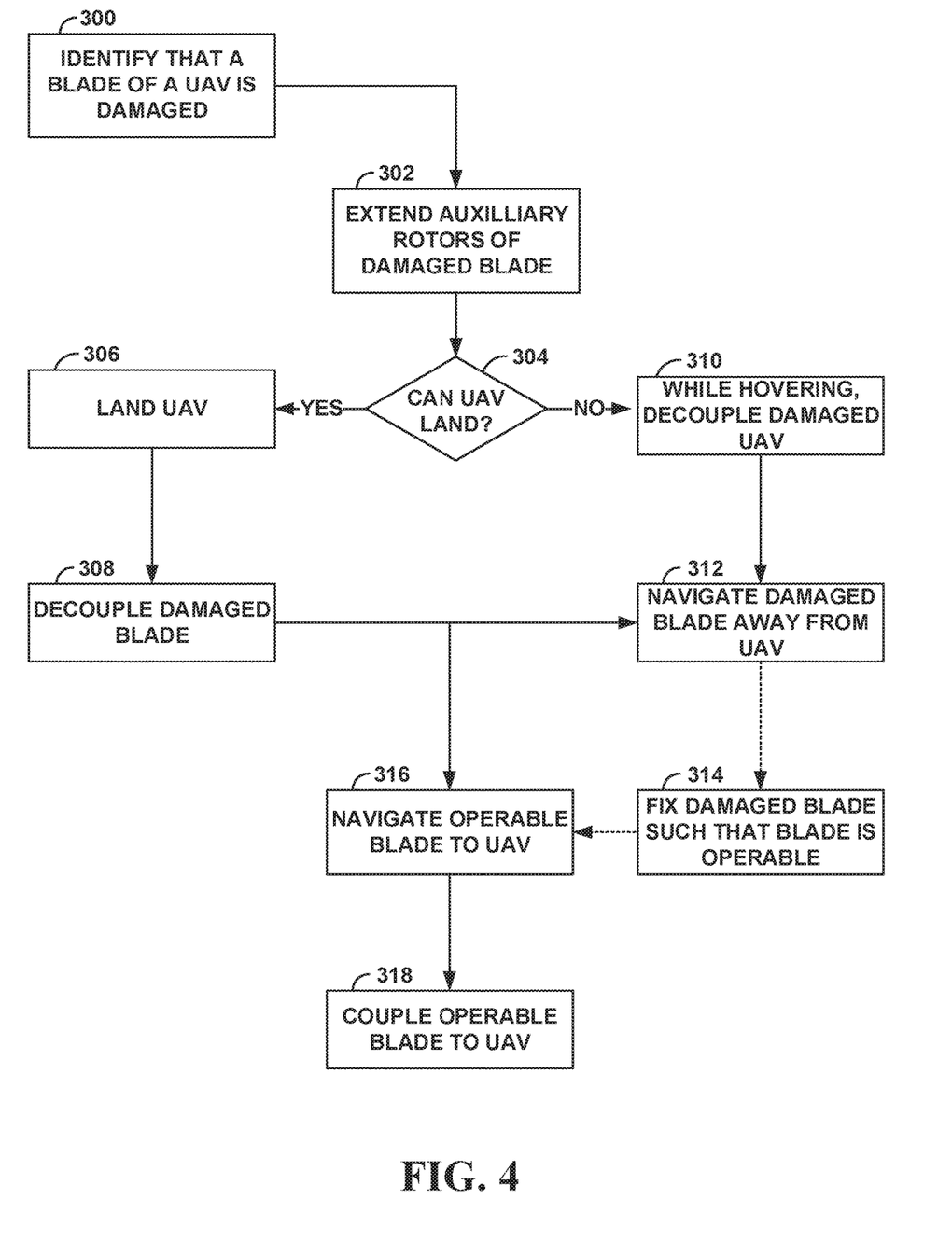
FIG. 4 depicts an example flowchart of managing maintenance of an UAV consistent with embodiments of this disclosure.

Using these components, controller 110 may detect damage to blades 112 and navigate those blades 112 away from UAVs 120 (and return an operable blade 112 to UAV 120) using auxiliary rotors 160 as discussed herein. For example, controller 110 may execute these steps according to the flowchart depicted in FIG. 4. The flowchart of FIG. 4 is discussed with relation to the systems and components of FIGS. 1A-2C for purposes of illustration, though it is to be understood that other UAVs and blades may be used to execute the flowchart of FIG. 4 in other examples. Further, in some examples the systems described herein may execute a different method than the flowchart of FIG. 4, or the systems described herein may execute a similar method with more or less steps, or similar steps in a different order, or the like.

As depicted in FIG. 4, controller 110 may identify that blade 112 of UAV 120 is damaged (300). Controller 110 may identify that blade 112 is damaged by comparing an instructed flight plan to an executed flight path of UAV 120, where the instructed flight plan is the desired route for UAV 120 to take and the executed flight path is the realized route that UAV 120 did take. Alternatively, or additionally, controller 110 may identify that blade 112 is damaged by analyzing a diagnostic system of UAV 120 that includes sensors of UAV 120. For example, controller 110 may identify that shape data indicates that a longitudinal end of a respective blade 112 is too close to hub 114 of this blade 112, such that blade 112 was bent in response to hitting a physical object.

In some examples, in response to identifying that blade 112 is damaged, controller 110 may lock blade 112 in place relative to UAV 120. Controller 110 may lock blade 112 in place while UAV 120 is still in the air. Controller 110 may lock blade 112 in place depending on a detected severity of the damage to blade 112, and/or controller 110 may lock blade 112 in place by default. Locking blade 112 in place may stabilize UAV 120 (e.g., by removing the variable of an unstable element where blade 112 is not rotating as intended), and/or may reduce a chance that a damage to blade 112 may increase as a result of continued rotation.

Controller 110 may extend auxiliary rotors 160 from cavities 162 of blade 112 (302). Controller 110 may extend auxiliary rotors 160 in response to identifying that blade 112 is damaged. Controller 110 may cause auxiliary rotors 160 to rotate to provide lifting force that is lost by locking blade 112. In this way, controller 110 may work to stabilize UAV 120 with auxiliary rotors 160 prior to executing any other actions.

In response to identifying that blade 112 of UAV 120 is damaged, controller 110 may determine whether or not UAV 120 may land (304). For example, controller 110 may analyze an surrounding environment of UAV 120 to determine whether or not there is a safe location for UAV 120 to land. Controller 110 may analyze images from camera 154 and/or data associated with a GPS location of UAV 120 to determine if there is a safe location. Controller 110 may analyze such factors as whether there is a location to which there is a safe unobstructed path of entry, such as a clearing in a field. Additionally, or alternatively, controller 110 may analyze a factor such as whether or not UAV 120 is likely to be damaged and/or otherwise interfered with while on the ground, such as because the clearing is on a busy street, sidewalk, playground, occupied horse pasture, or the like.

If controller 110 determines that UAV 120 can land, controller 110 may cause UAV 120 to land (306). Controller 110 may cause auxiliary rotors 160 to provide a lift force to stabilize UAV 120 while UAV 120 lands. Once the UAV 120 is landed, controller 110 may decouple the damaged blade 112 from body 150 of UAV 120 (308). Controller 110 may decouple the damaged blade 112 via an attachment mechanism that couples hub 114 of blade 112 to joint 170 of UAV 120. Alternatively, if controller 110 determines that UAV cannot land, controller 110 may cause blade 112 to detach from UAV 120 while UAV 120 hovers in the air (310). For example, if blade 112A is damaged, controller 110 may cause blade 112A to decouple as described herein such that blades 112B, 112C, 112D hold UAV 120 in a spot in the air until an operable blade 112 is returned to replace damaged blade 112A.

Controller 110 may navigate blade 112 away from body 150 of UAV 120 using auxiliary rotors 160 (312). Controller 110 may communicate with remote computer 130 to determine a location to which to navigate blade 112. For example, controller 110 may communicate with remote computer 130 to identify a nearest maintenance location at which blade 112 may be repaired. Alternatively, controller 110 may navigate blade 112 to a predetermined location in navigating away from UAV 120.

In some examples, controller 110 may identify whether or not blade 112 is quickly fixable. For example, if the damage of blade 112 is relatively easy to fix (e.g., a stiff bearing attaching blade 112 to joint 170 that requires lubrication or replacement), controller 110 may determine that blade 112 is to be fixed immediately such that blade 112 is operable (314). In such examples, upon the fix, controller 110 may navigate this now-operable blade 112 back to UAV 120 (316) and recouple the operable blade 112 to UAV 120 (318).

In other examples, controller 110 may determine that the damage to blade 112 is more substantial, such that a fix will be difficult, impossible, or otherwise lengthy. Alternatively, controller 110 may identify that a task of UAV 120 is too time-sensitive to wait for a repair to the damaged blade 112, regardless as to how quickly the damaged blade 112 may be repaired. In such examples where controller 110 identifies that it is not appropriate for UAV 120 to wait for damaged blade 112 to be repaired and sent back to UAV 120, controller 110 may instruct another blade 112 to navigate to UAV 120 (316), such that this alternate blade 112 may be coupled to UAV 120. Controller 110 may send this request substantially immediately upon detecting that blade 112 is damaged (300). Controller 110 may send this request to a central maintenance terminal such as remote computer 130 or the like. This request as sent by controller 110 may include enough information such that remote computer 130 is able to identify a sufficient replacement blade 112. For example, the request may include some predetermined specifications such as a model number of UAV 120 and/or a model number of blades 112 of UAV 120.

In response to this instruction a replacement blade 112 may be routed from the nearest repositories of replacement blades 112 and sent to UAV 120. The replacement blade 112 may fly to UAV 120 via auxiliary rotors 160 of the replacement blade 112, communicating with UAV 120 en route to identify a specific location of UAV 120 and a specific joint 170 to which hub 114 of replacement blade 112 is to couple. Once replacement blade 112 is secured to available joint 170 of UAV 120, the respective controller 110 of replacement blade 112 may cause auxiliary rotors 160 to stop rotating and move from the deployed state to the stowed state within cavities 162 of replacement blade 112 so that UAV 120 may again fly without drag force from the auxiliary rotors 160.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
a blade of an unmanned aerial vehicle that is configured to rotate relative to a body of the unmanned aerial vehicle to enable the unmanned aerial vehicle to fly, wherein the blade defines at least one cavity;
a power source within the blade;
at least one auxiliary rotor configured to use the power source to rotate relative to the blade to cause the blade to fly, wherein the at least one auxiliary rotor is configured to withdraw into the at least one cavity;
a processor; and
a memory in communication with the processor, the memory containing instructions that, when executed by the processor, cause the processor to:
   decouple the blade from the unmanned aerial vehicle;
   extend the at least one auxiliary rotor from the at least one cavity; and
   navigate the blade away from the unmanned aerial vehicle using the at least one auxiliary rotor.

2. The system of claim 1, wherein the at least one cavity is a first cavity and the at least one auxiliary rotor is a first auxiliary rotor, wherein the blade defines the first cavity adjacent a first longitudinal end of the blade and defines a second cavity adjacent a second longitudinal end of the blade, further comprising a second auxiliary rotor configured to rotate relative to the blade to work with the first auxiliary rotor to cause the blade to fly, wherein the second auxiliary rotor is configured to withdraw into the second cavity.

3. The system of claim 1, further comprising a camera affixed to the blade to enable to blade to navigate.

4. The system of claim 1, further comprising a global positioning system (GPS) component affixed to the blade to enable the blade to navigate.

5. The system of claim 1, the memory further containing instructions that, when executed by the processor, cause the processor to couple the blade to the unmanned aerial vehicle.

6. The system of claim 1, wherein memory contains additional instructions that, when executed by the processor, cause the processor to identify that the blade is damaged.

7. The system of claim 6, wherein the processor is configured to decouple the blade from the unmanned aerial vehicle in response to the processor identifying that the blade is damaged.

8. The system of claim 6, wherein the processor is configured to identify that the blade is damaged by comparing an instructed flight plan of the unmanned aerial vehicle to an executed flight path of the unmanned aerial vehicle.

9. The system of claim 6, wherein the processor is configured to identify that the blade is damaged by analyzing diagnostic data of the unmanned aerial vehicle.

10. A computer-implemented method comprising:
decoupling a blade of an unmanned aerial vehicle from the unmanned aerial vehicle, wherein the blade is configured to rotate relative to a body of the unmanned aerial vehicle to enable the unmanned aerial vehicle to fly, wherein the blade defines at least one cavity;
extending at least one auxiliary rotor from the at least one cavity, wherein the at least one auxiliary rotor is configured to use a power source of the blade to rotate relative to the blade to cause the blade to fly; and
navigating the blade away from the unmanned aerial vehicle using the at least one auxiliary rotor.

11. The computer-implemented method of claim 10, wherein the at least one cavity is a first cavity and the at least one auxiliary rotor is a first auxiliary rotor, wherein the blade defines the first cavity adjacent a first longitudinal end of the blade and defines a second cavity adjacent a second longitudinal end of the blade, further comprising a second auxiliary rotor configured to rotate relative to the blade to work with the first auxiliary rotor to cause the blade to fly.

12. The computer-implemented method of claim 10, further comprising coupling the blade to the unmanned aerial vehicle.

13. The computer-implemented method of claim 10, further comprising identifying that the blade is damaged.

14. The computer-implemented method of claim 13, wherein the decoupling the blade from the unmanned aerial vehicle is in response to identifying that the blade is damaged.

15. The computer-implemented method of claim 13, wherein the identifying that the blade is damaged includes comparing an instructed flight plan of the unmanned aerial vehicle to an executed flight path of the unmanned aerial vehicle.

16. The computer-implemented method of claim 13, wherein the identifying that the blade is damaged includes analyzing diagnostic data of the unmanned aerial vehicle.

17. A computer program product, the computer program product comprising a computer readable storage medium having program instructions embodied therewith, the program instructions executable by a computer to cause the computer to:
output a first command to decouple a blade of an unmanned aerial vehicle from the unmanned aerial vehicle, wherein the blade is configured to rotate relative to a body of the unmanned aerial vehicle to enable the unmanned aerial vehicle to fly, wherein the blade defines at least one cavity;
output a second command to extend at least one auxiliary rotor from the at least one cavity, wherein the at least one auxiliary rotor is configured to use a power source of the blade to rotate relative to the blade to cause the blade to fly; and
output a third command to navigate the blade away from the unmanned aerial vehicle using the at least one auxiliary rotor.

18. The computer program product of claim 17, the computer program product comprising additional program instructions that, when executed by the computer, cause the computer to couple the blade to the unmanned aerial vehicle.

19. The computer program product of claim 17, the computer program product comprising additional program instructions that, when executed by the computer, cause the computer to identify that the blade is damaged, wherein the decoupling the blade from the unmanned aerial vehicle is in response to identifying that the blade is damaged.

20. The computer program product of claim 19, wherein identifying that the blade is damaged includes at least one of comparing an instructed flight plan of the unmanned aerial vehicle to an executed flight path of the unmanned aerial vehicle or analyzing a diagnostic system of the unmanned aerial vehicle.

* * * * *